May 28, 1957     W. P. OEHLER ET AL     2,793,880
HITCH DEVICE OF THE CONNECTION FACILITATING TYPE
Original Filed March 26, 1952     2 Sheets-Sheet 1

INVENTORS.
WILLIAM P. OEHLER,
CHARLES H. YOUNGBERG &
LESLIE W. JOHNSON

ATTORNEYS

May 28, 1957  W. P. OEHLER ET AL  2,793,880
HITCH DEVICE OF THE CONNECTION FACILITATING TYPE
Original Filed March 26, 1952  2 Sheets-Sheet 2
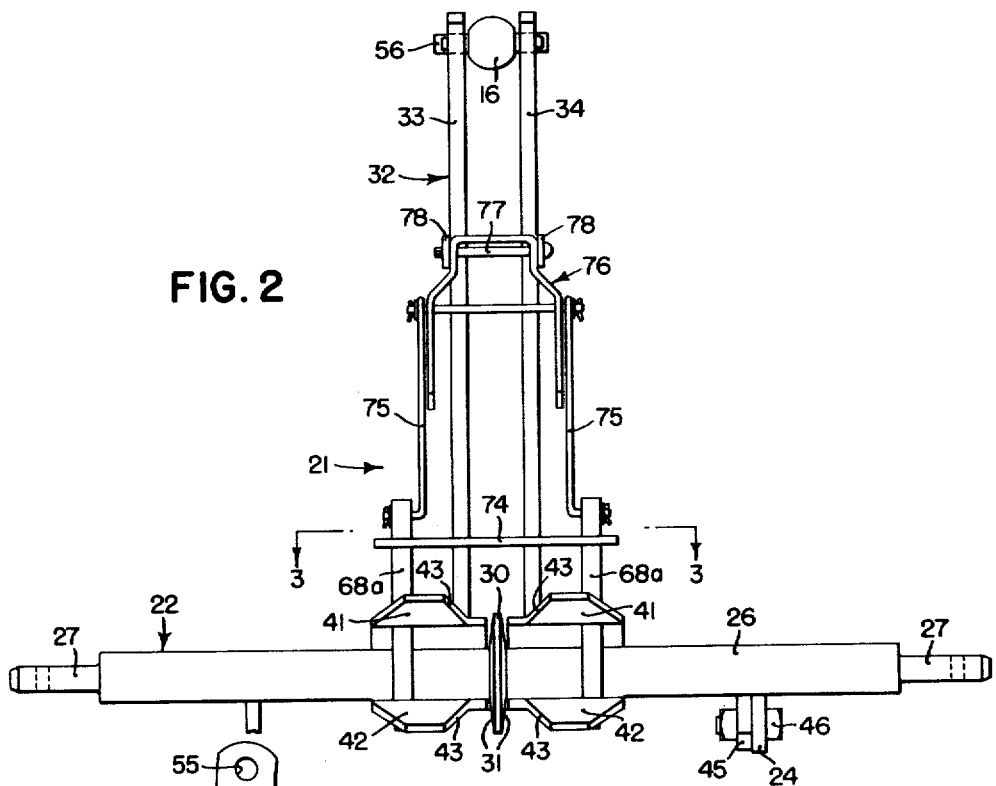
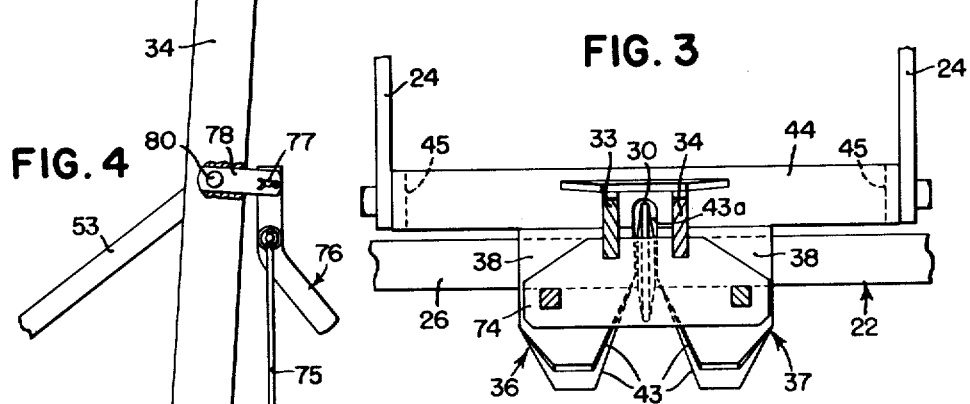
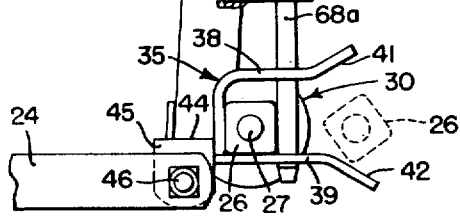
*INVENTORS.*
WILLIAM P. OEHLER,
CHARLES H. YOUNGBERG &
LESLIE W. JOHNSON
ATTORNEYS

United States Patent Office 2,793,880
Patented May 28, 1957

2,793,880

HITCH DEVICE OF THE CONNECTION FACILITATING TYPE

William P. Oehler, Charles H. Youngberg, and Leslie W. Johnson, Moline, Ill., assignors to Deere & Company, Moline, Ill., a corporation of Illinois Continuation of abandoned application Serial No. 278,698, March 26, 1952. This application July 26, 1954, Serial No. 445,838

16 Claims. (Cl. 280—477)

This is a continuation of our copending application Ser. No. 278,698, filed March 26, 1952, now abandoned, for Hitch Device.

The present invention relates generally to agricultural implements and more particularly to hitch devices and similar means for connecting an implement with a tractor or other propelling agency.

The object and general nature of the present invention is the provision of a hitch device particularly constructed and arranged for easy and convenient connection and disconnection. More specifically, it is an important feature of the invention to provide a hitch arrangement in which the tractor may readily and easily be backed into connected relation with the associated implement, the tractor power lift mechanism then actuated to raise the implement and the tractor then driven forwardly to transport the implement to the field or other place desired, all without requiring the operator to dismount from the tractor.

These and other objects and advantages of the present invention will be apparent to those skilled in the art after a consideration of the following detailed description, taken in conjunction with the accompanying drawings, in which:

Figure 2 is a front view, looking rearwardly, taken generally along the vertical plane of the line 2—2 of Figure 1, details of the implement being omitted in this figure.

Figures 3 and 4 are top and side views of the hitch device shown in Figure 2.

Figure 1:
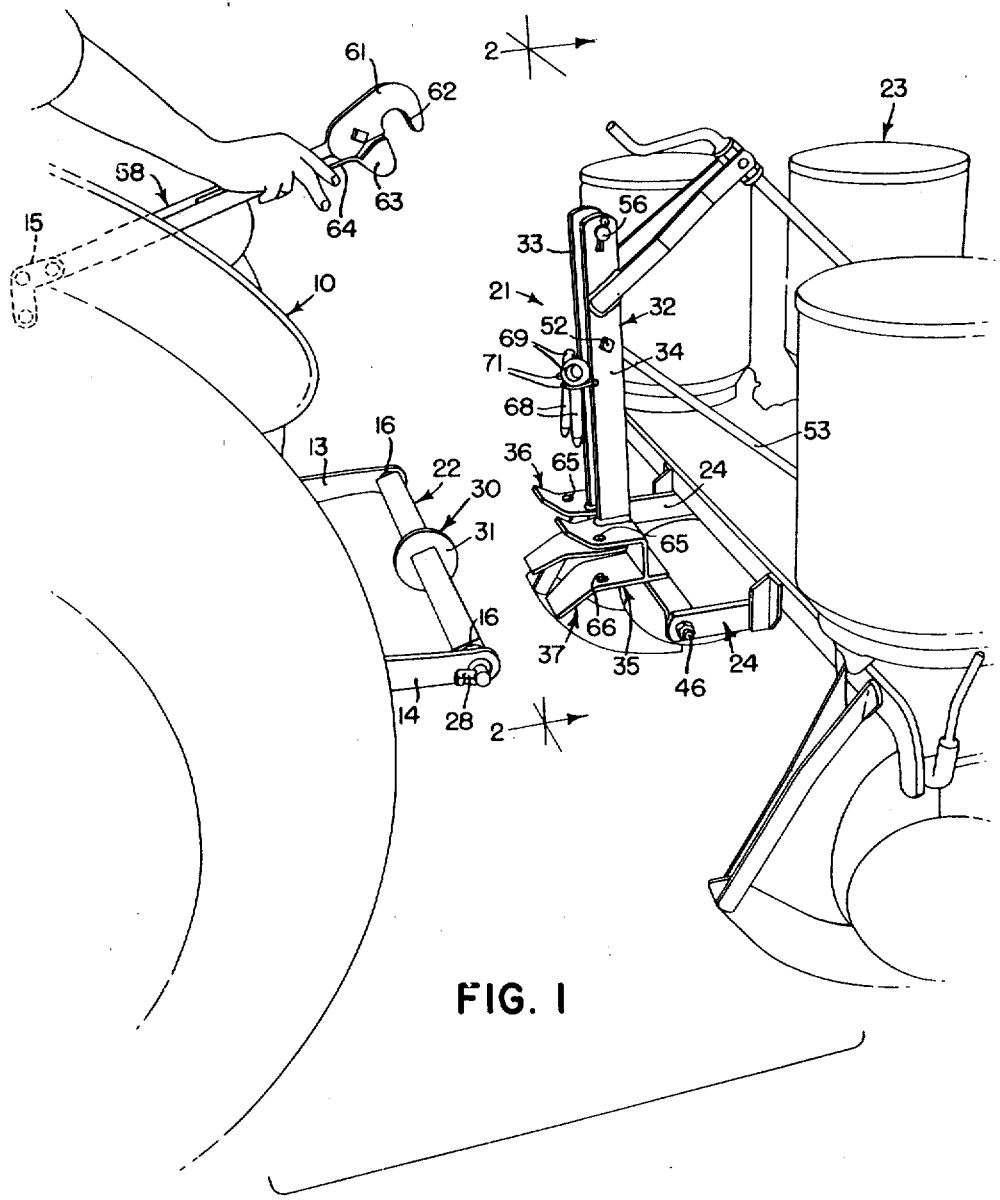
Figure 1 is a perspective view of a hitch device, constructed according to the principles of the present invention, the tractor and implement, with which the hitch device of the present invention is associated, being shown in the positions they occupy when backing the tractor into connected relation with the implement.

Referring now to Figure 1, the tractor is indicated by the reference numeral 10 and is of a well-known type having power lift apparatus similar to that shown in U. S. Patent 2,356,231, issued August 22, 1944, to H. G. Ferguson. The tractor 10 is provided with a pair of lower laterally and vertically swingable tension links 13 and 14, with means connected with said links for raising and lowering any implement or implements connected therewith. The tractor power lift mechanism just mentioned includes a generally fore-and-aft swingable bell crank 15 with which the forward end of an upper or compression link is adapted to be connected. The rear ends of the lower links 13 and 14 are provided with ball connectors 16 rockably disposed in sockets in the rear ends of the links 13 and 14 and apertured to receive studs and/or other implement-connecting parts.

The hitch device of the present invention includes two principal parts, one comprising an attaching frame structure, indicated in its entirety by the reference numeral 21, and the other comprising a crossbar 22. The attaching frame 21 is adapted to be connected to the implement which according to the present invention may be any one or more of the well-known ground-engaging or groundworking types, such implement being indicated by the reference numeral 23 and, as illustrated, includes forwardly extending frame sections 24 to which the lower portion of the hitch frame structure 21 is adapted to be connected. The crossbar 22 comprises a member 26, preferably square in cross section and having reduced ends 27 adapted to be inserted through the apertures in the ball connectors 16 mentioned above. The reduced ends 27 are apertured to receive quick detachable securing pins 28. Fixed to the central portion of the crossbar 26 is a guide member 30 which consists of a disk-like part welded or otherwise fixed to the crossbar 26 and having outwardly converging, generally conical wall portions 31. The crossbar 26 is freely rotatable in the apertures in the ball connectors 16.

The attaching frame structure 21, mentioned briefly above, comprises a mast section 32 that is made up of a pair of vertically extending, laterally spaced apart bars 33 and 34 rigidly connected at their lower ends to a socket member 35. The latter member 35 comprises a pair of U-shaped parts 36 and 37 each having an upper wall 38 and a lower wall 39 with outwardly diverging or flaring lips 41 and 42, respectively. The lower wall 39 extends forwardly beyond the upper wall 38, as best shown in Figure 4, and the vertical spacing between the upper wall portions 38 and the lower wall portions 39 preferably is greater than the diameter of the crossbar 26. The lower portion of the socket member 35 is rigidly secured, as by welding, to a lower cross member or base section 44 that is made up of a bar having downturned ends 45 apertured to receive bolts 46 or other means by which the frame member 24 of the associated implement is adapted to be connected therewith. The vertical mast bars 33 and 34 are apertured to receive a bolt 52 by which the forward portion of a brace 53, leading from the rear part of the implement, may be connected to the attaching frame 21 for stabilizing the implement relative to the hitch structure. The upper ends of the mast bars 33 and 34 are apertured, as at 55, to receive a pin 56 by which a ball connector, such as the part 16 mentioned above, may be connected to the upper end of the mast 32.

Reference was made above to an upper compression link that normally is attached at its forward end to the bell crank 15 of the tractor power lift mechanism. According to the principles of the present invention, an upper link 58, designed as a compression structure, is adapted to be pivotally connected at its forward end to the bell crank 15, and at its rear end the link member 58 carries an attaching hook member 61 that is specially formed, as at 62, to engage over the ball connector mounted on the pin 56. The hook member 61 is provided with a pivoted retaining latch 63 having a handle section 64 by which the latch or detent 63 may be moved between ball-engaging and ball-disengaging positions.

The operation of the hitch structure as so far described is substantially as follows. The implement adapted to be attached to the tractor 10 receives and supports the attaching frame structure 21, with the forwardly facing socket member 35 disposed in a position to receive the crossbar 26 that is, according to the present invention, attached to the laterally and vertically swingable tension or draft links 13 and 14. Figure 1 shows the relative position of the parts when the tractor is backed toward the implement for attaching the same to the tractor. As the tractor approaches the implement the crossbar 26 passes between the upper and lower flaring socket portions 41 and 42, whereby the crossbar is guided generally vertically into a position between the upper and lower wall portions 38 and 39. At the same time, the disk or guide member 30 is guided into its proper position, laterally of the implement and tractor, by virtue of forwardly diverging edges 43 formed on the lip portions 41 and 42 and the upper and lower wall portions 38 and 39 of the socket member. As best shown in Figure 3, the forwardly diverging edges 43 terminate in parallel, laterally spaced apart edge sections 43a, the distance between these parallel edge portions being substantially equal to the thickness of the disk or guide member 30. Thus, merely backing the tractor into position relative to the socket member 35 serves automatically to bring the crossbar 22 to the proper vertical and lateral position relative to the implement. When the crossbar 22 seats in the rearmost portion of the socket member 35, the upper link 58 may be manually operated to engage the hook portion 61 over the ball connector carried at the upper end of the mast structure 32, the operator swinging the link structure 58 manually and holding the latch 33 in its open position, as shown in Figure 1, until engagement over the associated ball connector is effected. Then by releasing the latch 63, the upper end of the attachment frame 21 is connected with the upper link 58.

Before driving forwardly, some means must be provided to retain the crossbar 22 in position in the socket member 35. To this end, and according to the principles of the present invention, we provide vertically aligned apertures 65 and 66 in the wall portions 38 and 39, and when the crossbar 26 is seated in the socket member 35, the openings 65 and 66 lie in front of the crossbar. Draft pins 68, one at each side of the center line and preferably square in cross section, are inserted in the vertically aligned openings 65 and 66 and serve as means whereby the tractor draws the implement along the ground. In one form of the present invention, as shown in Figure 1, the pins 68 are provided with finger holds 69 and carried in apertured lugs 71 on the bars 33 and 34 when the socket is detached from the implement. In the form of the invention shown in Figures 2–4, the connecting pins 68a are slidable in an apertured plate 74 and pivotally connected through links 75 with an operating toggle handle 76 which consists of a U-shaped member pivotally mounted at 77 on a pair of lugs 78 fixed, as by welding, to the mast 32. In this form of the invention, the brace rod 53 may be connected directly to a pin 80 extending through apertures in the mast bars 33 and 34 and the lugs 78.

The draft pin operating handle 76 is readily accessible to an operator on the seat of the tractor, and similarly, an operator on the tractor may readily reach the pins 68 (Figure 1) and insert them into or remove them from the pin-receiving openings 65 and 66. In both forms of draft pins, the latter are preferably held in a position in which a flat side of the pin is presented to the adjacent side of the crossbar 26. This materially reduces wear, as compared with the use of round pins and/or a round crossbar.

As indicated above, it is not necessary when backing the tractor into the implement that the crossbar 26 be in exact alignment with the space between the upper and lower socket wall sections 38 and 39. If there is a slight misalignment, as indicated in dotted lines in Figure 4, the flaring lip portions 41 and 42 will guide the crossbar 26 into the socket member. Further, since the lower walls 39 extend forwardly beyond the upper walls 38, if at the moment of contact between the crossbar 26 and the socket member 35, the crossbar 26 should lie in a rotatably displaced position, as indicated in dotted lines, the initial contact between these parts and subsequent relative movement will serve to rotate the crossbar 26 into a position to pass readily into the socket member, thereby preventing any possibility that the square crossbar will be disposed in a diagonal position in the socket member which might prevent the ready insertion of the hitch pins 68 or 68a. It will also be noted from Figure 4 that there is a certain amount of clearance in a vertical direction between the crossbar 26 and the upper and lower socket walls 38 and 39. This provides for a certain amount of oscillation of the implement relative to the draft links 13 and 14 and the associated crossbar 26 about a generally fore-and-aft extending axis. This provides for the implement following the ground surface when the outfit passes over uneven ground. Normally, the crossbar is held against angular movement in a horizontal plane relative to the socket member, and by virtue of this arrangement the implement swings relative to the tractor about a forward virtual pivot point determined by the amount of forward convergence of the links 13 and 14.

The rear end of the upper link 58 may at any time be readily disconnected from the upper end of the mast 32 merely by the operator reaching back and grasping the handle 64 to release the latch 63, whereupon the rear end of the link 58 may be lifted manually from its connection with the mast 32. By virtue of the hook portion 62 and the associated ball connector at the upper end of the mast, together with a loose connection at the forward end of the compression link 58, between the latter and the tractor bell crank 15, oscillation of the implement relative to the tractor about a generally fore-and-aft extending axis is accommodated.

In the form of the invention shown in Figure 1, the pin-receiving holes 65 and 66 are disposed from the rear wall of the socket a distance that is greater than the thickness or diameter of the crossbar 22. This is especially important where, as illustrated, the implement 23 is in the form of a planter, although it is to be understood that other tools or implements may be connected to the hitch device 21. However, when the implement 23 is a planter, the tractor tension links 13 and 14 preferably are held against lateral swinging, as by auxiliary stabilizing bars (not shown) which normally form part of the tractor 10. However, by virtue of the space just mentioned, the planter 23 may swing laterally relative to the hitch bar 22, as about one or the other of the pins 68, thereby permitting relatively short turns while, at the same time, the planter 23 tends normally to return to or stay in a fore-and-aft alined position.

Other implements, such as a disk harrow, for example, may be connected to a tractor by the hitch device of the present invention, and in the case of such implements as a single action or double action disk harrow the above mentioned stabilizing bars may be disconnected and the hitch device arranged so that it is held rigidly to the crossbar 22. This is the type of hitch device that is shown by way of illustration in Figures 2–4, particularly Figures 3 and 4.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a hitch construction for connecting an agricultural implement to a tractor to be propelled thereby, wherein said tractor is provided with a pair of laterally spaced apart, generally rearwardly extending tension links swingable both vertically and laterally relative to the tractor, the combination of a cross bar adapted to be rotatably and swingably connected at its ends with the rear portions of said tension links, a guide member fixed to the intermediate portion of said crossbar, a generally forwardly facing socket member adapted to be connected with said implement and adapted to receive said crossbar, said socket member having forwardly divergent sections disposable on opposite sides of the guiding part on said crossbar in substantially any position of the latter about its axis of rotation, whereby said tractor may be backed into said implement in non-aligned relation and said divergent sections will contact said guide member and shift the latter and said crossbar laterally to provide for the seating of the latter in said socket member, and draft-transmitting means for locking said socket member to said crossbar.

2. In a hitch construction for connecting an agricultural implement to a tractor to be propelled thereby, and wherein said tractor is provided with an upper compression link and a pair of lower laterally spaced apart tension links, the combination of a crossbar adapted to be rotatably and swingably connected at its ends with the rear ends of said lower links, a substantially circumferentially continuous guide member carried by said crossbar intermediate its ends and having radially projecting portions, an attaching member adapted to be carried at the front end of said implement and including a forwardly facing socket portion adapted to embrace and receive said crossbar and forwardly flaring sections adapted to engage the sides of said guide member whereby when the tractor is backed toward the implement in a position lateral of longitudinal alignment therewith said flaring sections engage the sides of said guide member and shift the tension links and the crossbar so as to bring the latter into a position to enter said socket member, means for connecting said attaching member in draft-transmitting relation with said crossbar, a vertical extension carried by said socket member, and latch means adapted to be connected to the rear end of said upper link and releasably engageable with the upper portion of said vertical extension.

3. The invention set forth in claim 2, further characterized by said socket member comprising upper and lower plate-like portions having, generally centrally thereof, forwardly facing, generally V-shaped notches adapted to receive between the side edges thereof said guide member.

4. The invention set forth in claim 3, further characterized by means carried by said socket member at opposite sides of said V-shaped notches for holding said crossbar seated in draft-transmitting connection with said socket member.

5. The invention set forth in claim 4, further characterized by means on said vertical extension for moving said crossbar-holding means into and out of crossbar-engaging position.

6. In a hitch construction for connecting an agricultural implement to a tractor of the type having a pair of laterally spaced apart, generally laterally and vertically swingable tension links connected at their forward ends with the tractor, the combination of a crossbar substantially polygonal in cross section and adapted to be rotatably and swingably connected at its ends with the rear ends of said tension links, implement guide means fixed to said crossbar intermediate the ends thereof and including guilding portions extending generally radially outwardly from a plurality of sides of said crossbar, a socket member adapted to be connected with said implement and including a forwardly facing portion having upper and lower parts adapted to embrace upper and lower sides of said crossbar, one of said upper and lower socket portions extending forwardly beyond the other portion, whereby movement of said crossbar, when the tractor is backed into the implement, into the bottom of said socket member is facilitated, and draft pin means adapted to be carried by said socket member and to engage the forward side of said crossbar, for transmitting draft between the tractor and said implement through said crossbar, and forwardly flaring guide portions on said socket member cooperating with the guide member on said crossbar for shifting the laterally swingable links of the tractor, together with said crossbar, in one direction or the other relative to the tractor, to facilitate backing the tractor into position relative to the implement without requiring any lateral maneuvering of the implement.

7. In a hitch construction for connecting an agricultural implement to a tractor to be propelled thereby, and wherein said tractor is provided with a pair of laterally spaced apart, vertically and laterally swingable tension links, the combination of a crossbar adapted to be connected at its ends with the rear ends of said links for both rocking and swinging movement relative thereto, a bar-receiving socket member having upper and lower portions spaced apart a distance greater than the thickness of said crossbar, one of said portions of said socket member being extended forwardly farther than the other portion, and both portions of said socket member flaring forwardly, generally horizontally and generally vertically, guide means fixed to said bar and engageable with the flaring portions of the socket member and including guiding portions extending generally radially outwardly from a plurality of sides of said crossbar to facilitate passage of said crossbar into position in said socket member, and draft-transmitting pin means carried by said socket member forward of said crossbar when the latter is disposed in position in said socket member, said pin means being arranged to lie flat against the forward side of said crossbar when in draft-transmitting relation therewith.

8. In a hitch construction for connecting an agricultural implement to a tractor to be propelled thereby, the combination of a pair of laterally spaced apart tension links adapted to be connected with the tractor for both lateral and vertical swinging movement, a crossbar connected at its ends with the rear ends of said tension links, a bar-receiving socket member having upper and lower portions spaced apart a distance greater than the thickness of said crossbar, each of said upper and lower portions having forwardly facing, generally V-shaped notches and both portions of said socket member flaring forwardly, to facilitate passage of said crossbar into position in said socket member, guide means on said crossbar extending generally radially outwardly of the crossbar and dimensioned to enter said generally V-shaped notches, said guide means being engageable with the edges of said notches for limiting relative lateral movement between the socket member and the crossbar, and draft-transmitting pin means carried by said socket member forward of said crossbar when the latter is disposed in position in said socket member.

9. For use in a hitch construction for connecting an agricultural implement to a tractor of the type having a pair of laterally spaced apart tension links: the combination of a crossbar adapted to be rotatably connected with the rear ends of said tension links about a transverse axis, a guide member connected to said crossbar, a generally forwardly facing socket member adapted to be connected with said implement and adapted to receive said crossbar, said socket member having forwardly divergent sections disposable on opposite sides of the guiding member on said crossbar in substantially any position of the latter about its axis of rotation, whereby said tractor may be backed into said implement in non-aligned relation and said divergent sections will contact said guide member and shift the latter and said crossbar laterally to provide for the seating of the latter in said socket member, and draft-transmitting means for locking said socket member to said crossbar.

10. For use in a hitch construction for connecting an agricultural implement to a tractor of the type having a pair of laterally spaced apart tension links: the combination of a crossbar adapted to be connected with one of said implement and said tension links, abutment means carried by said crossbar between the ends thereof and extending generally radially outwardly thereof, a socket member adapted to be connected with the other of said implement and said links and to receive said crossbar, said socket member having upper and lower portions spaced apart a distance greater than the thickness of said crossbar and said upper and lower portions having flaring outwardly extending sections engageable with said abutment means, and draft-transmitting pin means carried by said socket member in draft-transmitting relation with said crossbar when the latter is disposed in position in said socket member.

11. In a hitch construction for connecting an agricultural implement to a tractor to be propelled thereby, the combination of an upper compression link and a pair of lower laterally spaced apart tension links, adapted to be connected at their forward ends with the tractor for both lateral and vertical swinging, a crossbar rotatably and swingably connected at its ends with the rear ends of said lower links, a substantially circumferentially continuous guide member carried by said crossbar intermediate its ends and having radially projecting portions, an attaching member adapted to be carried at the front end of said implement and including forwardly facing socket portions adapted to embrace and receive said crossbar and forwardly flaring sections adapted to engage the sides of said guide member whereby when the tractor is backed toward the implement in a position lateral of longitudinal alignment therewith said baring sections engage the sides of said guide member and shift the tension links and the crossbar so as to bring the latter into a position to enter said socket member, and means for connecting said attaching member in draft-transmitting relation with said crossbar.

12. In a hitch construction for connecting an agricultural implement to a tractor to be propelled thereby, and wherein said tractor is provided with an upper compression link and a pair of lower laterally spaced apart tension links, the combination of a crossbar adapted to be rotatably and swingably connected at its ends with one of said implement and said lower links, a substantially circumferentially continuous guide member carried by said crossbar intermediate its ends and having radially projecting portions, an attaching member adapted to be carried by the other of said links and said implement and including an outwardly facing socket portion adapted to embrace and receive said crossbar and outwardly flaring sections adapted to engage the sides of said guide member whereby when the tractor is backed toward the implement in a position lateral of longitudinal alignment therewith said flaring sections engage the sides of said guide member and shift the tension links and the crossbar so as to bring the latter into a position to enter said socket member, and means for connecting said attaching member in draft-transmitting relation with said crossbar.

13. In a hitch construction for connecting an agricultural implement to a tractor to be propelled thereby, the combination of an upper compression link and a pair of lower laterally spaced apart tension links, adapted to be connected at their forward ends with the tractor for both lateral and vertical swinging, a crossbar rotatably and swingably connected at its ends with one of said implement and said lower links, a substantially circumferentially continuous guide member carried by said crossbar intermediate its ends and having radially projecting portions, an attaching member adapted to be carried by the other of said links and said implement and including outwardly facing socket portions adapted to embrace and receive said crossbar and outwardly flaring sections adapted to engage the sides of said guide member whereby when the tractor is backed toward the implement in a position lateral of longitudinal alignment therewith said flaring sections engage the sides of said guide member and shift the tension links and the crossbar so as to bring the latter into a position to enter said socket member, and means carried by said socket portions for connecting said attaching member in draft-transmitting relation with said crossbar.

14. In a hitch construction for connecting an agricultural implement to a tractor to be propelled thereby, the combination of a pair of laterally spaced apart tension links adapted to be connected with the tractor for both lateral and vertical swinging movement, a crossbar connected with one of said implement and said tension links, a guide member fixed to an intermediate portion of said crossbar, means adapted to be connected with the other of said implement and said links and providing generally outwardly facing socket means having upper and lower walls adapted to receive said crossbar, means adapted to be connected with the implement and providing outwardly diverging sections disposable on opposite sides of the guiding part on said crossbar, whereby said tractor may be backed into said implement in non-aligned relation and said divergent sections will contact said guide member and shift the latter and said crossbar laterally relative to the implement to provide for seating of the crossbar in said socket means, and draft-transmitting means for locking said socket means to said crossbar.

15. In a hitch construction for connecting an agricultural implement to a tractor to be propelled thereby, the combination of a pair of laterally spaced apart tension links adapted to be connected with the tractor for both lateral and vertical swinging movement, a crossbar pivotally and swingably connected with the rear ends of said tension links, a guide member fixed to an intermediate portion of said crossbar, means adapted to be connected with the implement and providing a generally forwardly facing socket member having upper and lower walls adapted to receive said crossbar, means adapted to be connected with the implement and providing forwardly divergent sections disposable on opposite sides of the guiding part on said crossbar in substantially any position of the latter about its axis of rotation, whereby said tractor may be backed into said implement in non-aligned relation and said divergent sections will contact said guide member and shift the latter and said crossbar laterally to provide for the seating of the latter in said socket member, and draft-transmitting means for locking said socket member to said crossbar.

16. For use in a hitch construction for connecting an agricultural implement to a tractor of the type having a pair of laterally spaced apart tension links: the combination of a crossbar adapted to be connected with the rear ends of said tension links, abutment means carried by said crossbar between the ends thereof and extending generally radially outwardly thereof, a socket member adapted to be connected with said implement, said socket member having upper and lower portions spaced apart to receive said crossbar therebetween, means associated with said socket member and connectible with the latter to said implement and forming flaring forwardly extending sections engageable with said abutment means to guide the crossbar and socket member into engaged relation, and draft-transmitting means for locking said socket member to said crossbar.

References Cited in the file of this patent

UNITED STATES PATENTS

| | | |
|---|---|---|
| 426,703 | Barber | Apr. 29, 1890 |
| 1,307,427 | Woodward | June 24, 1919 |
| 1,353,094 | Trumpour | Sept. 14, 1920 |
| 2,461,885 | Estes | Feb. 15, 1949 |
| 2,685,453 | Kuhary | Aug. 3, 1954 |

UNITED STATES PATENT OFFICE

CERTIFICATE OF CORRECTION

Patent No. 2,793,880 May 28, 1957

William P. Oehler et al.

It is hereby certified that error appears in the printed specification of the above numbered patent requiring correction and that the said Letters Patent should read as corrected below.

Column 7, line 19, for "baring" read -- flaring --.

Signed and sealed this 10th day of September 1957.

(SEAL)

Attest:
KARL H. AXLINE

Attesting Officer

ROBERT C. WATSON
Commissioner of Patents